US006524414B1

(12) United States Patent
Aichele et al.

(10) Patent No.: US 6,524,414 B1
(45) Date of Patent: Feb. 25, 2003

(54) METHOD FOR PRESSING CYLINDRICAL COMPOSITE BODIES

(75) Inventors: Wilfried Aichele, Winnenden (DE); Wolfgang Dressler, Vaihingen/Enz (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/787,807

(22) PCT Filed: Jul. 8, 2000

(86) PCT No.: PCT/DE00/02237

§ 371 (c)(1), (2), (4) Date: Jul. 25, 2001

(87) PCT Pub. No.: WO01/07223

PCT Pub. Date: Feb. 1, 2001

(30) Foreign Application Priority Data

Jul. 23, 1999 (DE) ........................................ 199 34 761

(51) Int. Cl.[7] .......................... C04B 37/00; A21C 11/00

(52) U.S. Cl. ................................ 156/89.11; 156/89.12; 156/381; 264/104; 264/122; 264/125; 425/500; 425/520

(58) Field of Search ................................ 264/104, 122, 264/125; 425/78, 500, 520; 156/89.11, 89.12, 381

(56) References Cited

U.S. PATENT DOCUMENTS

| | | | |
|---|---|---|---|
| 2,627,765 A | | 2/1953 | Hopkins |
| 3,794,458 A | | 2/1974 | Iwasaki |
| 4,009,977 A | | 3/1977 | Chao |
| 4,382,053 A | * | 5/1983 | Rigby |
| 4,920,640 A | * | 5/1990 | Enloe et al. |
| 5,676,891 A | * | 10/1997 | Boedinger |

FOREIGN PATENT DOCUMENTS

| | | |
|---|---|---|
| DE | 198 57 958 | 6/2000 |
| GB | 472 110 | 9/1937 |
| GB | 1 383 395 | 2/1974 |

* cited by examiner

*Primary Examiner*—Christopher A. Fiorilla
(74) *Attorney, Agent, or Firm*—Kenyon & Kenyon

(57) ABSTRACT

A method for producing ceramic composite bodies, in particular, cylindrical ceramic bodies for sheathed-element glow plugs, in which a plurality of shaping sleeves, which accommodate piece parts premolded by cold pressing, are inserted into corresponding bore holes of a vertically standing supporting plate that is heated via additional bore holes with the aid of cartridge heaters or a heat transfer liquid. The vertically standing supporting plate with the shaping sleeves is then clamped between two press plates of a press, and the piece parts located inside are subsequently pressed by press pins which, on both sides, pass through the press plates and into the shaping sleeves. Upon completion of the necessary pressure keeping period, the pressed compound, after retraction of the press pins and opening the press, can be hardened in a non-pressurized manner in the shaping sleeves located in the withdrawn supporting plate that is subjected to further heating. Finally, the pressed material can be removed from the shaping sleeves after the same have been cooled by air, and can be ground into the final shape using a grinding machine.

13 Claims, 2 Drawing Sheets

METHOD FOR PRESSING CYLINDRICAL COMPOSITE BODIES

This application is a 371 of PCT/DE 00/02237 filed Jun. 8, 2000.

FIELD OF THE INVENTION

The invention relates to a method for the production of composite bodies, of cylindrical ceramic composite bodies for sheathed-element glow plugs in particular, each of the piece parts to be joined being preformed from different materials by cold pressing, joined in a joining step, bonded in a hot pressing operation and subsequently brought to their final shape in a fabricating operation, as well as a press which is configured as a multi-cavity mold and is used for the production of the ceramic composite bodies

BACKGROUND INFORMATION

In such a known method implemented by Robert Bosch GmbH for the production of cylindrical ceramic bodies for sheathed-element glow plugs, a ceramic insulating layer is first produced by a cold pressing method and the conducting layers located to both sides of the insulating layer are produced separately. The insulating layer is subsequently inserted between the conducting layers and then initially joined in a cold pressing step. The resin is then cross-linked by a hot pressing method and the composite is formed. Finally, the composite plates are sawn into square bars and are profile ground for their fabrication. Due to the two press steps required for producing a ceramic composite body, namely the cold pressing and the hot pressing, dissimilar press molds are required, it being also necessary to switch from one press mold to another. Moreover, the division of the hardened ceramic composite plates into square bars and their subsequent grinding to a round shape is time-consuming and expensive.

SUMMARY OF THE INVENTION

The object of the present invention is to provide an economical production method for cylindrical ceramic composite bodies from previously cold pressed piece parts which are suitable for the production of ceramic sheathed-element glow plugs, as well as a press configured as a multi-cavity mold which can be used with this method and can sharply lower the production costs. In this connection, several particular properties of the resin for binding the ceramic powder must be taken into account; thus, for example, the hot pressed composites should not be removed from the press mold until after it has cooled since the hot cylindrical ceramic composite bodies are deformed or even damaged under the influence of demolding forces.

In an exemplary embodiment of the present invention, the joining step is made up of one step in which the piece parts are inserted into a shaping sleeve and each of the two ends of the shaping sleeve is closed by an axially movable ram. Next, at least one shaping sleeve prepared in this manner is placed into a corresponding bore hole of an insulating plate and from there is pressed into a bore hole of a hot supporting plate of steel which is aligned with this bore hole, the supporting plate being in parallel contact with the insulating plate for a short time. Next, the heated supporting plate with the shaping sleeve is clamped between two press plates of a press and then both ends of the piece parts located in the shaping sleeve are pressed with spring-loaded press pins which axially engage the end rams of the clamping sleeve and pass through the two press plates which are also heated.

Next, the pressed piece parts remain under pressure in the shaping sleeve and the latter remains in the hot supporting plate between the hot press plates for a necessary pressure keeping period. Next, the press pins are then retracted, the press is opened, the supporting plate is withdrawn from the press plates and the compound pressed in the shaping sleeve is further hardened in the hot supporting plate without pressure. Finally, the shaping sleeve is ejected from the hot supporting plate and cooled, and the cooled cylindrical molding is subsequently removed from the shaping sleeve, the time-consuming grinding of square bars to a round shape is thereby avoided. Since the press used can be set up as a 100-cavity mold, the production of such cylindrical ceramic composite bodies for ceramic sheathed-element glow plugs is considerably simplified and the costs are considerably reduced by the increase of throughput thus attained.

Such a press designed as a multi-cavity mold which is suitable for the production method in an exemplary embodiment of the invention has a supporting plate, whose thickness preferably corresponds to the length of the shaping sleeves, is designed with parallel and regularly spaced bore holes which are drilled perpendicularly through the supporting plate with a diameter adapted to contain the shaping sleeves and with second bore holes lying in the center plane of the supporting plate for the circulation of a heating medium or to contain cartridge heaters. This supporting plate is clamped between two press plates using centering elements so that individually spring-loaded press pins movably arranged in corresponding bore holes of the press plate are aligned with the bore holes in the supporting plate and the guide sleeves of the individually spring-loaded press pins are each connected with a movable pressure plate on the side of the press plates facing away from the supporting plate.

DETAILED DESCRIPTION

Figure 1:
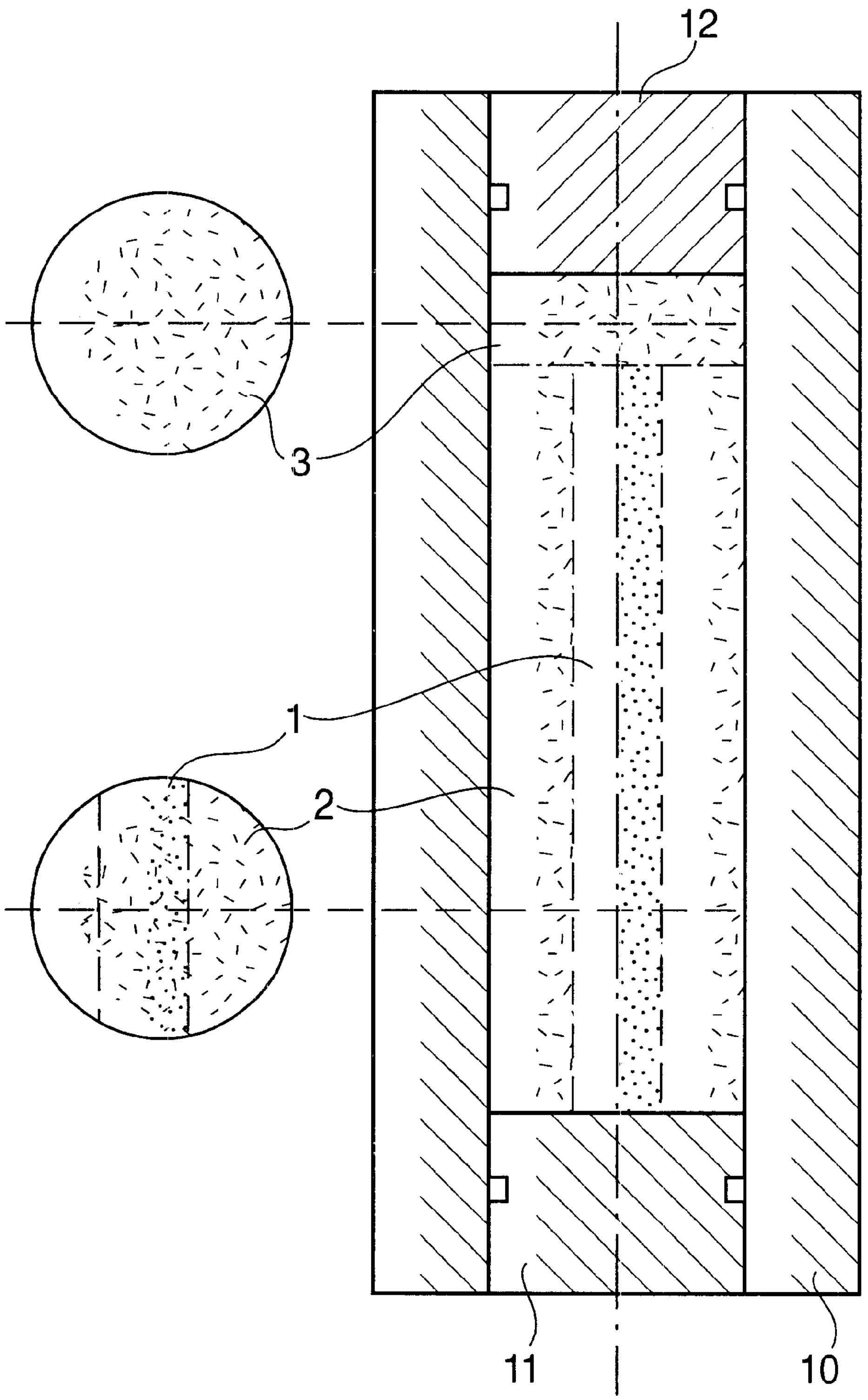
FIG. 1 shows a longitudinal section through a shaping sleeve used according to the present invention in schematic form, the shaping sleeve being provided for the pressing of cold preformed piece parts composed of binder and ceramic powder between two fitted pressure rams.

FIG. 1 shows a longitudinal section of a cylindrical shaping sleeve 10 and the pre-pressed parts inserted into this shaping sleeve 10, the latter also being shown in cross-section on the left side. The pre-pressed part made up of an insulating prepressed part 1 and two conducting pre-pressed parts 2 surrounding insulating pre-pressed part 1 on both sides is covered by a cap 3 of premolded conductive material. For the production of sheathed-element glow plugs, these piece parts 1 to 3 are composed of ceramic powders bound in a solid resin. Each end of shaping sleeve 10 is closed by a movable ram 11 and 12. For the preferred use for the production of sheathed-element glow plugs, shaping sleeve 10 forms a cylindrical sleeve, several of which can be pressed into the corresponding bore holes of the supporting plate at the same time.

Figure 2:
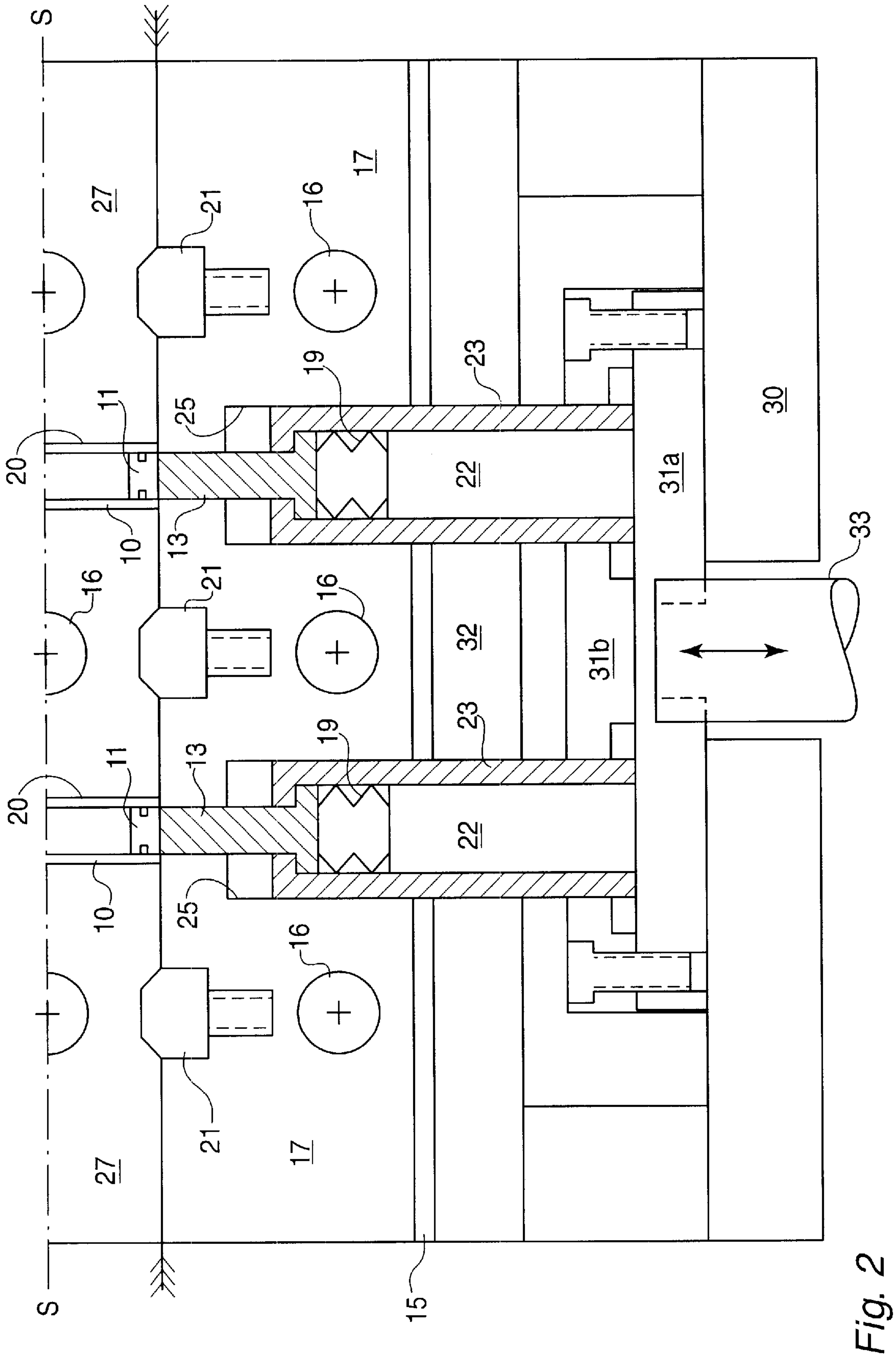
FIG. 2 shows a section of a press according to the present invention having a multi-cavity mold with inserted shaping sleeves in schematic form and in cross-section.

FIG. 2 shows a schematic cross-section through supporting plate 27, press plates 17 placed on both sides of press plate 17, pressing plates 31*a* and 31*b* which are bolted together and movable via rod 33, and press pins 13 which are movable in press plates 17 via belleville disc springs 19 and tension pins 22. It is obvious that FIG. 2 does not show the complete press with multi-cavity molds but rather only a section of the same with center plane S—S of supporting plate 27 as a plane of symmetry.

When the press shown as sections in FIG. 2 is filled, shaping sleeves 10 prepared according to FIG. 1 are inserted into bore holes of an insulating plate, which is not shown here but has the same hole pattern as supporting plate 27, as into a bottle shelf. Insulating plate is then pressed against heated steel supporting plate 27 from one side in such a way that the corresponding bore holes of the insulating plate and the supporting plate are aligned, shaping sleeves 10 are simultaneously transferred from the bore holes of the insulating plate into the corresponding bore holes 20 of heated supporting plate 27 by means of a mechanism which is not shown here, supporting plate 27 being positioned in the press between the two press plates 17 and the press being mechanically or hydraulically locked, conical centering pins 21 ensuring that the press pins inserted into press plates 17 and shaping sleeves 10 in the supporting plate are in axial alignment. It can be recognized that FIG. 2 shows only two bore holes 20 in the supporting plate with two shaping sleeves with pressure rams 11 pressed into them and that the line S—S represents both the center plane of the supporting plate as well as the plane of symmetry of the complete press.

Supporting plate 27 and press plates 17 are heated via bore holes 16 either by a flowing heat transfer liquid or via inserted cartridge heaters.

In addition to half of supporting plate 27, FIG. 2 shows only one side of the press with press plate 17, two spring-loaded press pins 13, the spring mechanism comprised of belleville disc springs 19, the tension pins for belleville disc springs 19 and guide sleeves 23 which are fixedly joined to the two-piece pressing plate 31*a* and 31*b*, lower stop plate and upper stop plate 32 and insulating plate 15 which thermally insulates press plate 17 from the other area of the press. Also illustrated in FIG. 2 are the boring holes 25 for guide sleeves 23.

When press plates 17 are placed on supporting plate 27, the two-piece pressing plates 31*a* and 31*b* on both sides are retracted to the respective lower stop plates 30. In this position of the pressing plates, press pins 13 close flush with the surface of press plates 17. During the pressing operation, two-piece pressing plate 31*a*, 31*b* is moved from both sides against supporting plate 27 which is clamped between press plates 17. As a result, press pins 13 press against rams 11 and 12 in shaping sleeves 10 and the identical pressing force is applied to both ends of the pre-pressed part. Press pins (pressure pins) 13, which are individually spring-loaded via pre-stressed belleville disc springs 19, exert approximately identical compressive forces on molded bodies of even somewhat varying length in shaping sleeves 10. As a result, molded bodies are obtained which have undergone the same temperature-pressure profile during hardening and slightly varying lengths are accepted. Guide sleeves (spring sleeves) 23 can be moved no further in the direction of A supporting plate 27 than to the stop of pressing plates 31*b* on upper stop plates 32

After the end of the press time, pressing plates 31*a*, 31*b* are retracted via press rods 33 as far as lower stop plates 30 on both sides. As a result, the heads of press pins 13 are in contact with the shoulders in guide sleeves 23. The press pins are thus withdrawn from shaping sleeves 10 and are once again flush with the surfaces of press plates 17.

After the press is opened, supporting plate 27 can be withdrawn from between the two press plates 17. The pressed compound then continues to harden without pressure in shaping sleeves 10 which are still located in the bore holes of the heated supporting plate. After the end of the hardening time, shaping sleeves 10 are ejected from hot supporting plate 27, cooled in air and the pressed sheathed-element glow plugs are pressed out of shaping sleeves 10 with movable rams 11 and 12. The shaping sleeves and rams are cleaned and the shaping sleeves are refilled with pre-pressed parts and sealed with the pressure rams. The cooled sheathed-element glow plug blanks are ground to their final form on a grinder.

The press with a multi-cavity mold, which may, for example, be a 100-cavity mold, shown schematically in FIG. 2 replaces the several press dies required for changeover in the known method and reduces the expense needed for grinding since supporting plate 27 is held at a constant hardening temperature during the total hardening operation with and without compacting pressure. The hardening time without pressure following the hot pressing suggests that several of the economical supporting plates be used for each press so that the presses which are substantially more expensive than the supporting plates can be used without down time. In addition, the fact that the supporting plate need not be cooled down and heated reduces the press times in relation to the previous plate press method. Thus a clear reduction of the production costs of ceramic sheathed-element glow plugs is attained.

What is claimed is:

1. A method for producing a composite body, the method comprising the steps of:

pre-forming by cold pressing each of a plurality of piece-parts, each of the plurality of piece-parts made from a different material, joining the plurality of piece-parts, wherein the joining step comprises the sub-steps of inserting the plurality of piece-parts into at least one shaping sleeve, the at least one shaping sleeve having two ends, closing a first end of the at least one shaping sleeve by a first axially movable ram and closing a second end of the at least one shaping sleeve by a second axially movable ram, placing the at least one shaping sleeve into an insulating plate bore hole, pressing the at least one shaping sleeve into at least one supporting plate bore hole in at least one hot supporting plate which is in alignment with the insulating plate bore hole, the at least one hot supporting plate lying parallel to at least one insulating, plate and adjoining it for a predetermined time;

clamping the at least one hot supporting plate and the at least one shaping sleeve in a press between a plurality of heated press plates, wherein the plurality of piece-parts located in the at least one shaping sleeve are then pressed by a first press pin and a second press pin, the first press pin pressing in an axial direction by a first axially movable ram on a first side of the at least one shaping sleeve, the second press pin pressing in an axial direction by a second axially movable ram on a second side of the at least one shaping sleeve, the first and second press pins passing through the plurality of heated press plates, the plurality of heated press plates and the at least one hot supporting plate remaining at a predetermined temperature;

maintaining the plurality of piece-parts under pressure in the at least one shaping sleeve and maintaining the at least one shaping sleeve in the at least one hot supporting plate between the plurality of heated press plates for a predetermined pressure-keeping period;

retracting the first and second press pins, opening the press;

withdrawing the at least one hot supporting plate from the plurality of heated press plates, a compound, formed from the plurality of piece-parts, pressed in the at least one shaping sleeve being further hardened without pressure in the at least one hot supporting plate;

ejecting the at least one shaping sleeve from the at least one hot supporting plate, cooling the at least one shaping sleeve, removing at least one cooled-molded body, formed from the compound, from the at least one shaping sleeve, and fabricating the at least one cooled-molded body to a final shape in a fabricating operation.

2. The method according to claim 1, wherein the at least one hot supporting plate accepts a plurality of shaping sleeves in a parallel position.

3. The method according to claim 1, wherein the clamping step includes the sub-steps of:

aligning the plurality of heated press plates with the at least one supporting plate bore hole;

penetrating by the first and second press pins the plurality of heated press plates; and engaging by the first press pin the first axially movable ram and engaging by the second press pin the second axially movable ram.

4. The method according to claim 3, wherein the first and second press pins are pre-stressed in a plurality of guide sleeves via a plurality of tension pins, each of the plurality of tension pins having at least one belleville disc spring, and the plurality of guide sleeves are movable in the plurality of heated press plates and are fixedly joined to a plurality of movable pressure plates, each of the plurality of movable pressure plates bolted to another of the plurality of movable pressure plates.

5. The method according to claim 4, wherein the at least one hot supporting plate is a 100-cavity mold.

6. The method according to claim 1, wherein the plurality of heated press plates and the at least one hot supporting plate are vertically aligned and the at least one shaping sleeve lies horizontally in the at least one supporting plate bore hole.

7. The method according to claim 1, wherein at least one of the at least one hot supporting plate and the plurality of heated press plates has a heating bore hole, the heating bore hole at least one of accommodating at least one cartridge heater and circulating a temperature control medium.

8. The method according to claim 7, wherein the heating bore hole is in the at least one hot supporting plate and is situated between the at least one supporting plate bore hole and a press plate bore hole containing a plurality of guide sleeves in the plurality of heated press plates and is perpendicular to them.

9. The method according to claim 1, wherein:

the composite body is a cylindrical ceramic body for sheathed-element glow plugs, and the at least one shaping sleeve is cylindrical.

10. The method according to claim 9, wherein the predetermined pressure-keeping period is about 15 minutes.

11. The method according to claim 9, wherein a combination of the plurality of piece-parts includes:

an insulating core lying centrally and axially in the at least one shaping sleeve, the insulating core having a first side and a second side; and a first conductive body and a second conductive body lying axially within the at least one shaping sleeve, wherein:

the first conductive body is adjacent to the first side of the insulating core, the second conductive body is adjacent to the second side of the insulating core;

the insulating body insulates the first conductive body from the second conductive body and insulates the second conductive body from the first conductive body, the insulating body contacts with a first side and a second side of an interior wall of the at least one shaping sleeve, the first side of the interior wall opposite the second side of the interior wall in a radial direction;

the combination of the plurality of piece-parts thus inserted into the at least one shaping sleeve has a cylindrical external contour which is in contact with the interior wall of the at least one shaping sleeve, and the cylindrical external contour has a first end and a second end, the first end of this cylindrical external contour sealed by a cylindrical pre-pressed part of the same diameter as the cylindrical external contour.

12. A press configured as a multi-cavity mold for the production of composite bodies comprising:

means for pre-forming by cold pressing each of a plurality of piece-parts, each of the plurality of piece-parts made from a different material;

means for joining the plurality of piece-parts, wherein the joining means includes means for inserting the plurality of piece-parts into a plurality of shaping sleeves, each of the plurality of shaping sleeves having a first end and a second end, the first end of each of the plurality of shaping sleeves being closed by a first axially movable ram, and the second end of each of the plurality of shaping sleeves being closed by a second axially movable ram;

means for placing each of the plurality of shaping sleeves into an insulating plate bore hole of at least one insulating plate;

means for pressing each of the plurality of shaping sleeves into at least one supporting plate bore hole in at least one hot supporting plate which is in alignment with the insulating plate bore hole, the at least one hot supporting plate lying parallel to the at least one insulating plate and adjoining it for a predetermined time;

means for pressing the plurality of piece-parts situated in each of the plurality of shaping sleeves by a first spring-loaded press pin and a second spring-loaded press pin, the first spring-loaded press pin pressing in an axial direction by a first axially movable ram on a first side of each of the plurality of shaping sleeves, the second spring-loaded press pin pressing in an axial direction by a second axially movable ram on a second side of each of the plurality of shaping sleeves, the first and second spring-loaded press pins passing through the plurality of heated press plates, the plurality of heated press plates and the at least one hot supporting plate remaining at a predetermined temperature;

means for maintaining the plurality of piece-parts under pressure in the at least one shaping sleeve and means for maintaining the at least one shaping sleeve in the at least one hot supporting plate between the plurality of heated press plates for a predetermined pressure-keeping period;

means for retracting the first and second spring-loaded press pins;

means for opening the press;

means for withdrawing the at least one hot supporting plate from the plurality of heated press plates and for further hardening a compound pressed in each of the plurality of shaping sleeves without pressure in the at least one hot supporting plate;

means for ejecting the plurality of shaping sleeves from the at least one hot supporting plate, means for cooling the plurality of shaping sleeves; and means for removing at least one cooled-molded body from the plurality of shaping sleeves, wherein:

a plurality of supporting plate bore holes in the at least one hot supporting plate are spaced regularly, the plurality of supporting plate bore holes passing perpendicularly through the at least one hot supporting plate with a diameter adapted to accommodate a plurality of shaping sleeves;

the at least one hot supporting plate is clamped in the press using centering aids between the plurality of heated press plates, the first and second spring-loaded press pins are retracted in the plurality of heated press plates, the first and second spring-loaded press pins are aligned with the plurality of shaping sleeves in the at least one hot supporting plate, the first and second spring-loaded press pins moving against the at least one hot supporting plate from a first side and from a second side, first and second axially movable rams pressing the compound enclosed in each of the plurality of shaping sleeves; and the at least one hot supporting plate and the plurality of heated press plates have a heating bore hole in a plate plane between the plurality of supporting plate bore holes for at least one of an accommodation of electrical cartridge heaters and a circulation of a heat-transfer medium.

13. The press according to claim 12, wherein the at least one insulating plate between the plurality of heated press plates and a plurality of upper stop plates thermally insulates the at least one hot supporting plate and the plurality of heated press plates from a remaining portion of the press.

* * * * *